W. McClure,
Jaw Trap,
Nº 83,074.   Patented Oct. 13, 1868.
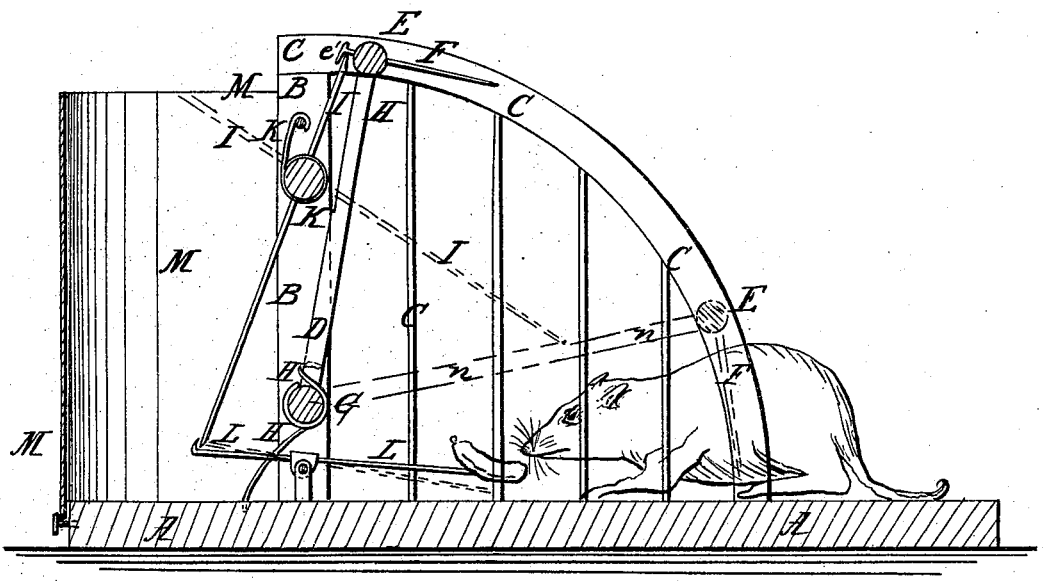
Witnesses:
Jno. A. Morgan
G. C. Cotton
Inventor.
W. McClure
per Munn & Co
Attorneys

United States Patent Office.

WILSON McCLURE, OF SINKING SPRING, OHIO.

Letters Patent No. 83,074, dated October 13, 1868.

IMPROVED ANIMAL-TRAP.

The Schedule referred to in these Letters Patent and making part of the same.

*To all whom it may concern:*

Be it known that I, WILSON McCLURE, of Sinking Spring, in the county of Highland, and State of Ohio, have invented a new and useful Improvement in Animal-Traps; and I do hereby declare that the following is a full, clear, and exact description thereof, which will enable others skilled in the art to make and use the same, reference being had to the accompanying drawings, forming part of this specification, in which the figure is a vertical longitudinal section of my improved trap.

Similar letters of reference indicate like parts.

My invention has for its object to furnish a simple, cheap, and effective trap, by means of which the animal may be killed when caught.

It consists in the construction and combination of the various parts, as hereinafter more fully described.

A is the bottom plate of the trap, to the upper side of which, near its rear end, are attached the lower ends of two parallel posts, B.

C are the sides of the trap, which are attached to the bottom, A, and the posts B. The sides C may slope or curve from the top of the posts B to the bottom, A, as shown in the figure, and may be made close or open, as desired. I prefer to make the sides C of lattice-work or slats, so that the animal may see the bait, but be unable to reach it without entering between the sides C.

D is a lever or bar, to the outer end of which is attached a cross-head, E, having downwardly-projecting spikes, F, attached to it. The other end of the bar D is attached to the roller G, the ends of which are pivoted to the inner sides of the lower part of the posts B.

H is a spring, the ends of which rest upon the bottom, A, and which is coiled around the roller G, and is connected with the bar D, so as to force down the said bar when the trap is sprung, forcing the spikes F through the animal, killing him instantly.

I is the trip-lever, which is passed through and secured to the roller J, the ends of which are pivoted to the inner sides of the upper parts of the posts B, and around which is coiled the spring K, in such a way as, when the trap is sprung, to bring the said lever I into the position shown in red in the drawing, with the end of its long arm resting upon the bar D, holding it and the cross-head E and spikes F down upon the animal caught by said spikes F.

L is the bait-rod, which is pivoted to a support attached to the bottom, A, directly beneath the roller G. To the end of the forward or long part of the rod L is attached the bait, and upon the end of the rear or short part of said rod is formed a hook or catch, upon which the end of the long arm of the trip-lever I is caught in setting the trap, the end of the short arm of the said lever I being at the same time caught upon a catch, e, formed upon or attached to the cross-head E, as shown in the drawing, so that as the animal enters the trap, and touches the bait, he springs the trap and catches and kills himself.

M is a curved metallic casing enclosing the rear part of the trap, and which is removably secured in place, so that it may be readily detached, to obtain more convenient access to the operating-parts of the trap for convenience in setting it, and which at the same time prevents the animal from approaching the bait otherwise than by passing in beneath the cross-head E and spikes F.

Having thus described my invention,

I claim as new, and desire to secure by Letters Patent—

The described arrangement of the spring H, roller G, bar D, cross-head E, spikes F, spring K, roller J, trip-lever I, and bait-rod L, with relation to each other, the bottom, A, posts B, sides C, and removable casing M, all operating as described for the purpose specified.

WILSON McCLURE.

Witnesses:
DYNES COPELAND,
S. E. HIESTAND.